United States Patent
Le Meur et al.

(10) Patent No.: US 9,348,049 B2
(45) Date of Patent: May 24, 2016

(54) SIMULTANEOUS JOINT ESTIMATION OF THE P-P AND P-S RESIDUAL STATICS

(75) Inventors: David Le Meur, Gif-sur-Yvette (FR); Guillaume Poulain, Montrouge (FR)

(73) Assignee: CGG SERVICES SA, Massy (FR)

( * ) Notice: Subject to any disclaimer, the term of this patent is extended or adjusted under 35 U.S.C. 154(b) by 860 days.

(21) Appl. No.: 13/611,650

(22) Filed: Sep. 12, 2012

(65) Prior Publication Data
US 2013/0176823 A1    Jul. 11, 2013

Related U.S. Application Data

(60) Provisional application No. 61/583,231, filed on Jan. 5, 2012.

(51) Int. Cl.
  *G01V 1/28*    (2006.01)
  *G01V 1/36*    (2006.01)

(52) U.S. Cl.
  CPC ............ *G01V 1/362* (2013.01); *G01V 2210/53* (2013.01)

(58) Field of Classification Search
  CPC ..... G06F 19/00; G01V 1/28; G01V 2210/612
  USPC ................ 702/14, 17, 18, 16; 367/73, 75, 77
  See application file for complete search history.

(56) References Cited

U.S. PATENT DOCUMENTS

| | | | | |
|---|---|---|---|---|
| 2,112,084 A * | 3/1938 | Frey et al. | | 148/111 |
| 5,508,914 A | 4/1996 | Lee | | |
| 5,671,136 A * | 9/1997 | Willhoit, Jr. | | 702/18 |
| 5,850,622 A * | 12/1998 | Vassiliou et al. | | 702/17 |
| 5,855,011 A * | 12/1998 | Tatsuoka | | 706/45 |
| 5,897,952 A * | 4/1999 | Vigo et al. | | 428/393 |
| 5,920,828 A * | 7/1999 | Norris et al. | | 702/14 |
| 6,049,760 A * | 4/2000 | Scott | | 702/14 |
| 6,424,920 B1 * | 7/2002 | Osypov | | 702/18 |
| 6,535,818 B1 * | 3/2003 | Baeten | | 702/17 |
| 6,725,076 B1 * | 4/2004 | Jensen | | 600/407 |
| 6,757,616 B1 * | 6/2004 | Emmons et al. | | 702/18 |
| 7,069,150 B2 * | 6/2006 | Mackie | | 702/17 |
| 7,752,022 B2 * | 7/2010 | Fornel et al. | | 703/10 |
| 7,859,945 B2 * | 12/2010 | Sallas et al. | | 367/190 |
| 8,406,081 B2 * | 3/2013 | Xia et al. | | 367/73 |
| 2002/0087272 A1 * | 7/2002 | Mackie | | 702/14 |
| 2009/0019411 A1 * | 1/2009 | Chandra et al. | | 716/9 |
| 2009/0222211 A1 * | 9/2009 | Burnstad et al. | | 702/17 |
| 2009/0299184 A1 * | 12/2009 | Walker et al. | | 600/447 |

(Continued)

OTHER PUBLICATIONS

Eaton, Estimation of P-Sv residual statics by stack-power optimization, 1991. http://www.crewes.org/ForOurSponsors/ResearchReports/1991/1991-07.pdf.*

(Continued)

*Primary Examiner* — Luke Ratcliffe
*Assistant Examiner* — Amienatta M Ndure Jobe
(74) *Attorney, Agent, or Firm* — Patent Portfolio Builders PLLC

(57) ABSTRACT

Methods and systems for estimating the residual static terms for multi-component land datasets are described. A one-pass estimation simultaneously using P-P pre-stack data and P-S pre-stack data for generating common source residual statics for the P-P data and the P-S data and separate receiver residual statics for the P-P data and the P-S data. A series of iterations are performed using either a linear or a non-linear simulation to converge on acceptable residual statics.

22 Claims, 7 Drawing Sheets

(56) References Cited

U.S. PATENT DOCUMENTS

2011/0075516 A1* 3/2011 Xia et al. .................. 367/53
2013/0176823 A1* 7/2013 Le Meur et al. ............ 367/75

OTHER PUBLICATIONS

Larsen, Avo Inversion by Simultaneous P-P and P-S Inversion; M.Sc. Thesis University of Calgary Department of Geology and Geophysics, 1999.*

GB Search Report mailed May 30, 2013 and issued in related Application GB1300127.6.

Side Jin et al., "Robust inversion for converted wave receiver statics," 74th Annual International Meeting of Society Exploration Geophysicists., Denver, Colorado, Oct. 10-15, 2004.

S. Kirkpatrick et al., "Optimization by Simulated Annealing," Science., vol. 220, No. 4598, May 13, 1983.

David Le Meur et al., "Monte Carlo Statics: The Last Frontier," CSEG Annual Convention, May 15-17 2006.

David Marsden, "Static corrections—a review," The Leading Edge, Jan. 1993, pp. 210-216.

Nicholas Metropolis et al., "Equation of Stat Calculations by Fast Computing Machines," The Journal of Chemical Physics, vol. 21, No. 6, Jun. 1953.

Joshua Ronen et al., "Surface-consistent Residual Statics Estimation by Stack-power Maximization," 54th SEG Meeting Atlanta Georgia Dec. 1985.

Daniel H. Rothman, "Automatic Estimation of Large Residual Statics Corrections," Geophysics, vol. 51, No. 2 Feb. 1986, pp. 332-346.

Kris Vasudevan et al., "Simulated annealing statics computation using an order-based energy function," Geophysics, vol. 56, No. 11, Nov. 1991, pp. 1831-1839.

Peter W. Cary et al., "A simple method for resolving large converted-wave (P-SV) statics," Geophysics, vol. 58, No. 3, Mar. 1993, pp. 429-433.

Daniel H. Rothman, "Non linear inversion, statistical mechanics, and residual statics estimation," Geophysics, vol. 50, No. 12 (Dec. 1985); pp. 2784-2796.

* cited by examiner

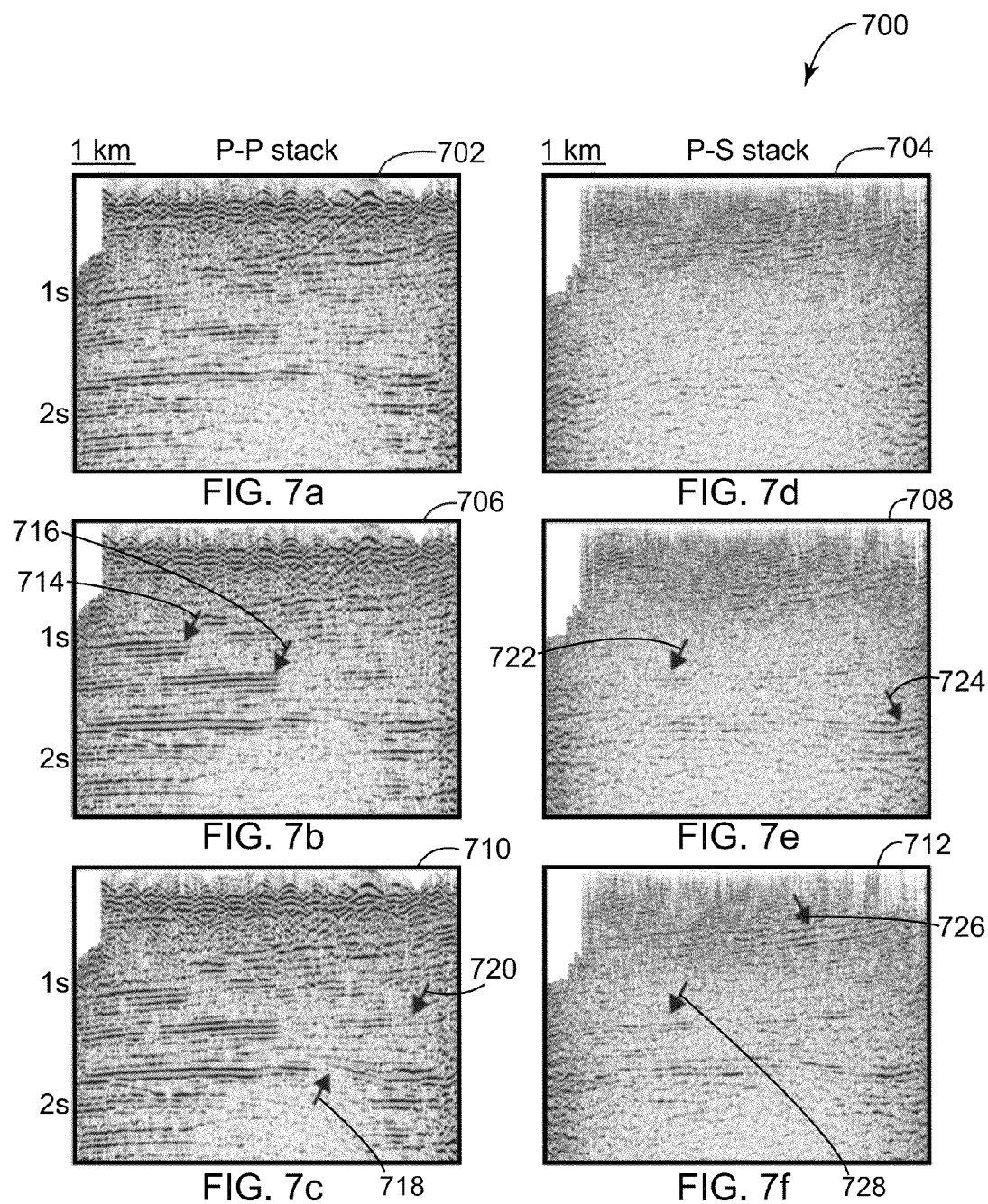

SIMULTANEOUS JOINT ESTIMATION OF THE P-P AND P-S RESIDUAL STATICS

RELATED APPLICATION

The present application is related to, and claims priority from U.S. Provisional Patent Application No. 61/583,231, filed Jan. 5, 2012, entitled "Simultaneous Joint Estimation for P-P and P-S Residual Statics," to David Le Meur and Guillaume Poulain, the disclosure of which is incorporated herein by reference.

TECHNICAL FIELD

Embodiments of the subject matter disclosed herein generally relate to methods and systems for land-based or shallow marine seismic data processing and, more particularly, to mechanisms and techniques for estimating static terms for multi-component datasets.

BACKGROUND

Land-based or shallow marine seismic data acquisition and processing techniques are used to generate a profile (image) of a geophysical structure (subsurface) of the underlying strata. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The estimation of residual static terms for a multi-component data set is a challenge. Estimating residual statics in two-dimensions and three-dimensions for P-P data or for converted waves such as P-S data is part of time or depth seismic processing. Conventional approaches of evaluating residual statics on P-P data and P-S data are predominantly based on linear inversion involving cross correlation functions as described by J. Ronen and J. F. Claerbout in their 1985 article entitled "Surface-Consistent Residual Statics Estimation by Stack Power Maximization" published in Geophysics and S. Jin, J. Li and S. Ronen in their 2004 paper entitled "Robust Inversion for Converted Wave Receiver Statics," presented at the 74th Annual International Meeting of the Society of Exploration Geophysicists or trace-to-trace coherence of the common receiver stack section as described by P. W. Cary and W. S. Eaton in their 1993 article entitled "A Simple Method for Resolving Large Converted-Wave (P-Sv) Statics" published in Geophysics.

Further, it has been shown that the estimation of large-magnitude residual statics is better handled with a non-linear system, as described by Daniel H. Rothman in his 1985 article entitled "Non-linear Inversion, Statistical Mechanics and Residual Statics Estimation" and his 1986 article entitled "Automatic Estimation of Large Residual Statics Corrections" both published in Geophysics, based on a Monte Carlo method, as described by D. Le Meur and S. Merrer in their paper entitled "Monte Carlo Statics: The Last Frontier" presented at the 2004 Canadian Society of Exploration Geophysicists Annual Convention, and coupled with a simulated annealing approach, as described by K. Vasudevan, W. G. Wilson and W. G. Laidlaw in their 1991 article entitled "Simulated Annealing Statics Computation Using an Order-based Energy Function" published in Geophysics. Accordingly, in converted waves processing, shear (transverse) wave receiver statics are characterized by a large magnitude which can be two to ten times greater than P-P static values as well as by noisier input data than the P-P data.

It is known in the art that different methods are used for computing surface-consistent residual statics on P-P data and receiver statics on P-S data as described by D. Marsden in his 1993 article entitled "Static Corrections—A Review" published in The Leading Edge. Most of these methods are based on the use of cross-correlation functions and a solution of a system of linear equations, which very frequently give a local minimum solution based on the nature of the data. A non-linear approach, however, using the simulated annealing concept, as described by S. Kirkpatrick, C. D. Gelatt, Jr. and M. P. Vehhi in their 1983 article entitled "Optimization by Simulated Annealing" published in Science, coupled with a Monte Carlo technique, as described by N. Metropolis, A. Rosenbluth, M. Rosenbluth, A. Teller and E. Teller in their 1953 article entitled "Equation of State Calculations by Fast Computing Machines" published in the Journal of Chemistry and Physics, allows computing any type of residual statics at the global minimum.

Looking now to background art FIG. 1, a flowchart 100 for estimating P-P residual statics 110, 112 and P-S residual statics 116 is depicted. The method is a two-pass calculation with the first pass 102 operating on the P-P data 106 and the second pass 104 operating on P-S data 108 and the P-P source residual statics 110 output from the first pass 102. The first pass 102 is dedicated to calculating P-P source residual statics 110 and P-P receiver residual statics 112 by applying a non-linear statics solver 114 to the P-P data 106. The second pass 104 is dedicated to calculating the P-S residual statics 116 by applying the P-P source residual statics 110 to the P-S data 108 and then applying the non-linear statics solver 114 to the updated P-S data 108. The two-pass nature of this approach leads to undesirably long computational times based on the data access mechanisms for the large volume of data associated with the P-P data 106 and the P-S data 108.

Accordingly, it would be desirable to provide systems and methods that avoid the afore-described problems and drawbacks, and improve the accuracy of the final images which are produced as a result of such seismic surveys.

SUMMARY

According to an exemplary embodiment, a method, stored in a memory and executing on a processor, for estimating residual reflection statics includes simultaneously utilizing a plurality of seismic datasets in a single pass, wherein at least a portion of said plurality of seismic datasets overlap, performing one or more weighted simulations of the plurality of seismic datasets until a predetermined stop condition, based on a shared cost function, for the estimating is met and outputting simultaneously estimated residual reflection statics based on the one or more simulations of the plurality of seismic datasets after the stop condition is met.

According to another exemplary embodiment, a system for estimating residual reflection statics includes a first seismic dataset communicatively connected to a processor, a second seismic dataset communicatively connected to a processor wherein at least a portion of said first seismic dataset and said second seismic dataset overlap, one or more processors configured to execute computer instructions and a memory configured to store the computer instructions wherein the computer instructions further include an estimation component for simultaneously processing the first seismic dataset and the second seismic dataset based on a shared cost function and an output component for outputting simultaneously estimated residual reflection statics.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7(a)-(f) are composite schematic diagrams of P-P and P-S stack data showing raw data, cascaded (two-pass) estimated data and simultaneous joint estimation stack data.

DETAILED DESCRIPTION

Figure 1:
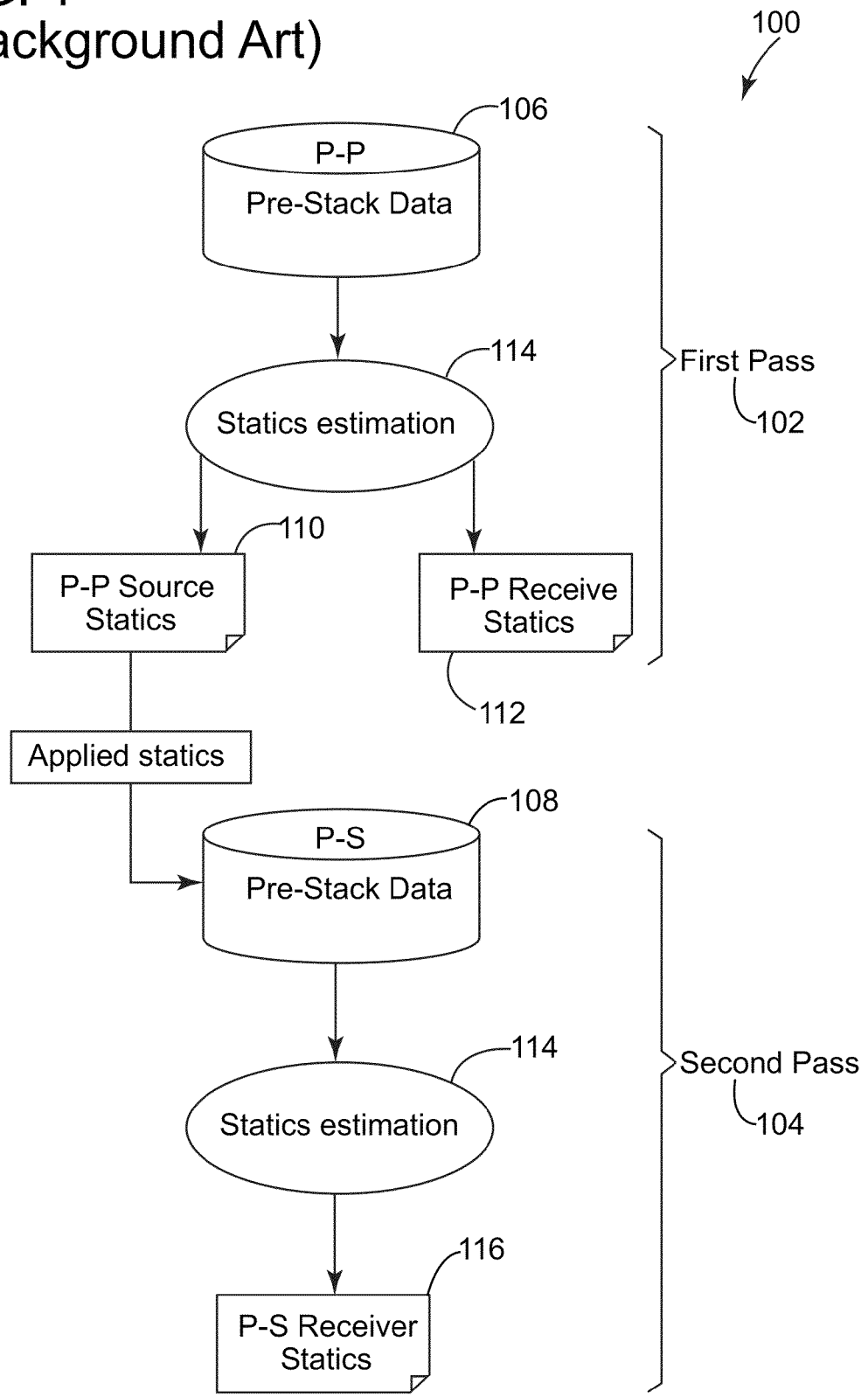
FIG. 1 is a background art schematic diagram for a two-pass system for estimating P-P and P-S residual statics.

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of estimating residual statics for P-P data and P-S data. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. The methods and systems described herein generate and receive P-waves and S-waves. A P-wave is the wave studied in conventional seismic data and is an elastic body wave or sound wave in which particles oscillate in the direction the wave propagates. P-waves incident on an interface at other than normal incidence can produce reflected and transmitted S-waves, otherwise known as converted waves. It should be noted that P-P data is seismic data associated with a propagating P-wave.

An S-wave, generated by most land seismic sources and sometimes as converted P-waves, is an elastic body wave in which particles oscillate perpendicular to the direction in which the wave propagates. S-waves, also known as shear waves, travel more slowly than P-waves and cannot travel through fluids because fluids do not support shear. It should be noted that S-waves can also be converted to P-waves. Recording of S-waves requires receivers coupled to the solid earth and their interpretation can allow determination of rock properties such as fracture density and orientation, Poisson's ratio, and rock type by cross-plotting P-wave and S-wave velocities and other techniques. It should be noted that P-S data is seismic data corresponding to a down-going P waves then an up-going S wave propagation.

In a further description of terminology, a shotpoint is one of a number of locations or stations at the surface of the earth at which a seismic source is activated. A seismic trace is the seismic data recorded, by one channel, after the seismic source has been fired. The seismic trace represents the response of the elastic wave field to velocity and density contrasts across interfaces of layers of rock or sediments as energy travels from the seismic source through the subsurface to a receiver or receiver array. Further, a seismic inversion is a process of transforming seismic reflection data into a quantitative property description of a strata description of an underground location and possibly a reservoir containing natural resources such as oil or gas.

Further in the context for the subsequent exemplary embodiments, it should be noted that estimating simultaneously the residual reflection statics for sources and receivers is accomplished by jointly using both the P-P data and the P-S data. In another aspect of an exemplary embodiment, the Simultaneous Joint Estimation (SJE) can use a linear or a non-linear approach. Continuing with an exemplary embodiment, Simultaneous Joint Estimation is a one-pass algorithm which allows the simultaneous derivation of common source residual reflection statics for both the P-P data and the P-S data and separate receiver residual statics, one for the P-P data and one for the P-S data. In another aspect of an exemplary embodiment, the aforementioned model is operational regardless of the software implementation, i.e., parallel or non-parallel processing, the size of the databases, the data dimensions, i.e., two-dimensional (2D) or three-dimensional (3D), and the acquisition design of the P-P data and the P-S data.

Continuing with the general context description of an exemplary embodiment, the Simultaneous Joint Estimation uses a single cost function that guarantees a consistency for the computation of the three residual reflection static terms. In another aspect of the general context for the exemplary embodiments, the cost function benefits from the weight of a cleaner P-P data to estimate both common sources' and specific receivers' residual reflection statics for the P-S data. Further, in the general context for the exemplary embodiments, the Simultaneous Joint Estimation approach offers an economical advantage with a reduction in the turnaround time for processing P-P data and P-S data for estimating residual reflection statics.

The exemplary embodiments in general have a plurality of seismic data inputs such as, but not limited to, bins, wherein their stack sections overlap partially or totally, source stations, receiver stations and any combinations of the above referenced seismic data inputs. Further, the exemplary embodiments generally have outputs such as, but not limited to, source residual reflection statics for a first seismic dataset, receiver residual reflection statics for a first seismic dataset, source residual reflection statics for a second seismic dataset, receiver residual reflection statics for a second seismic dataset and any combinations of the above referenced seismic data outputs. Continuing with a general description of the exemplary embodiments, a simultaneous joint inversion that simultaneously inputs and processes the plurality of seismic datasets with a shared linear or non-linear cost function until a predetermined stop condition is met and the residual reflection statics, as previously described, are output.

Figure 2:
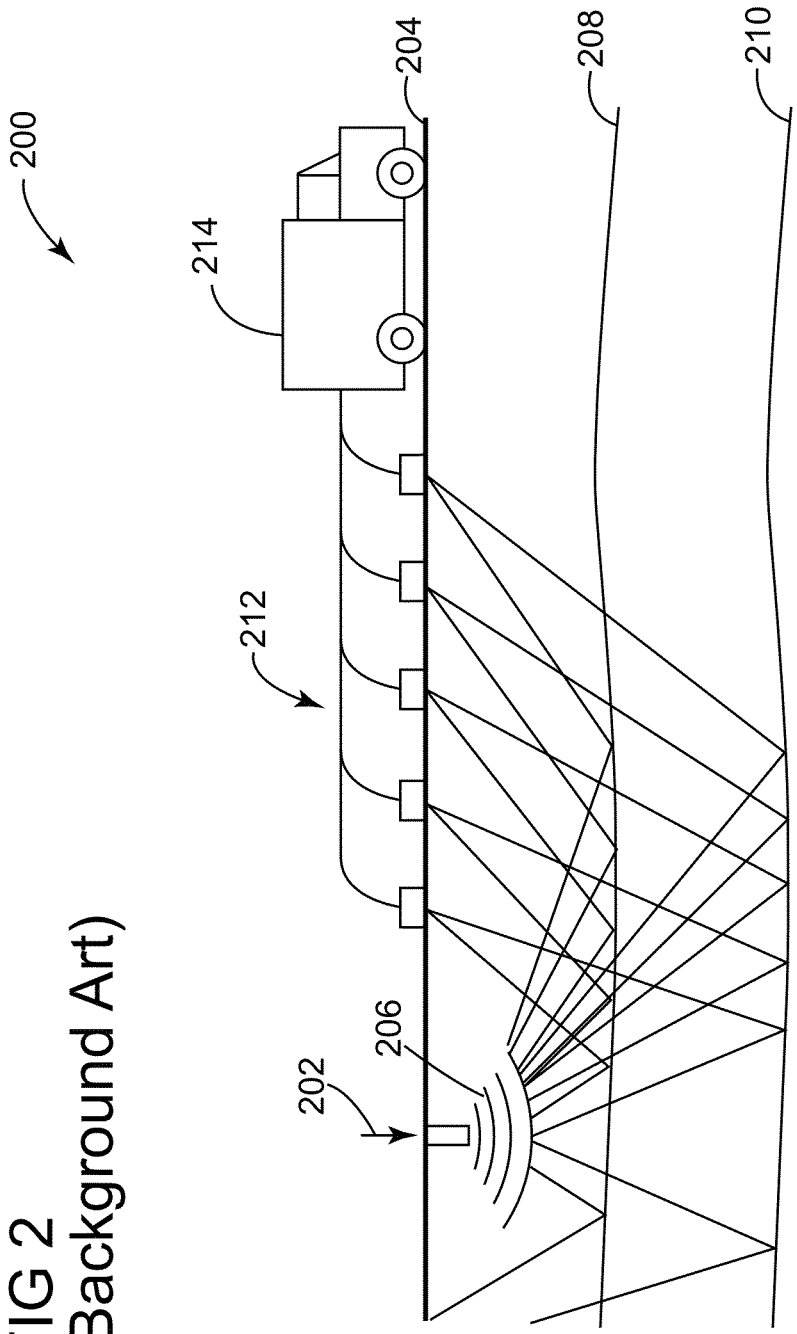
FIG. 2 is a background art schematic diagram showing a land-based seismic data acquisition system.

Looking now to FIG. 2, a context diagram illustrates the previously described aspects. A shot is fired at a shotpoint 202 on the surface 204 of the earth to propagate a series of waves 206 through different layers 208, 210 under the surface 204. The waves are reflected by the interfaces at the different layers 208, 210 at different times after the shot is fired and at different angles. The reflected waves are detected by receivers 212 attached to the earth. A recording device 214 collects the seismic data from the receivers and records the data for future analysis. It should be noted in the exemplary embodiment that computations on the recorded data can occur in the recording device 214 or they can occur in another location after the seismic data has been transferred.

Figure 3:
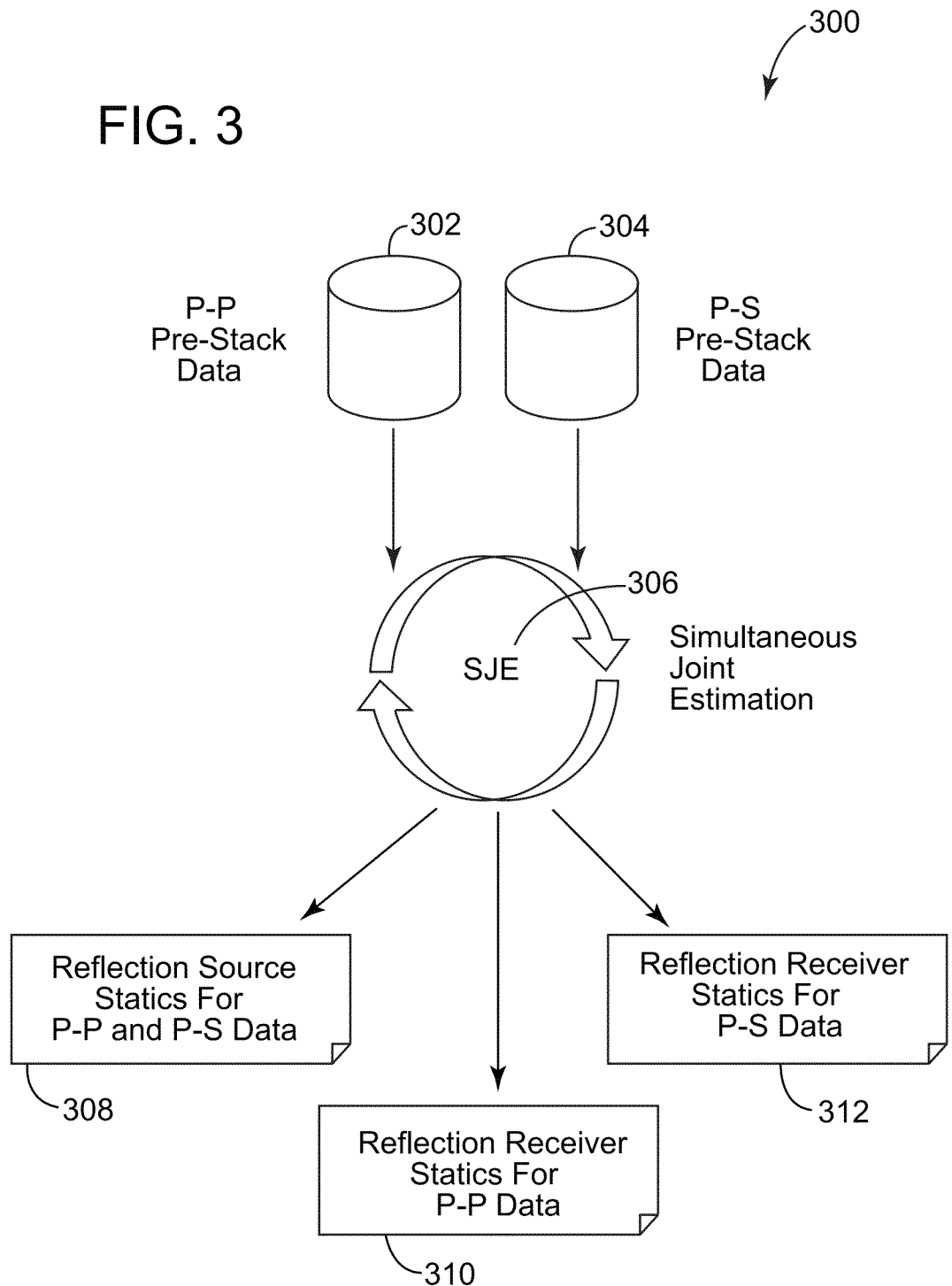
FIG. 3 is a schematic diagram of an exemplary embodiment simultaneous joint estimation system for simultaneously processing P-P pre-stack data and P-S pre-stack data and outputting P-P and P-S residual statics.

Looking now to FIG. 3, a Simultaneous Joint Estimation processing system 300 is depicted. The Simultaneous Joint Estimation system 300 comprises a P-P pre-stack database 302, a P-S pre-stack database 304, a Simultaneous Joint Estimation engine (estimation component) 306 and generates reflection source statics for the P-P and the P-S data 308, reflection receiver statics for the P-P data 310 and reflection receiver statics for the P-S data 312. It should be noted in the exemplary embodiment that the Simultaneous Joint Estimation engine 306 can use a linear or a non-linear approach to determining the reflection statics 308, 310, 312. It should further be noted in the exemplary embodiment that the Simultaneous Joint Estimation engine 306 is also called an estimation component. Continuing with the exemplary embodiment, the Simultaneous Joint Estimation engine 306 reads both the P-P pre-stack data and the P-S pre-stack data for simultaneous operation, i.e., a single pass operation.

Continuing with the exemplary embodiment, the Simultaneous Joint Estimation process takes advantage of high performance computing techniques allowing the optimization of access operations resulting in a minimization of data access time for operations such as a non-linear inversion. For example, a Monte Carlo approach uses a cost function which is based on the coherence of the data stack 302, 304 with robust criteria for stabilizing the results. Continuing with the example, input and/or output throughput is the main bottleneck when a non-linear method based on simulated annealing are applied on large wide-azimuth datasets. At each simulation step of the example, stations are visited in a random order and for each station several associated collections including shots, receivers, common mid-point (CMP) or asymptotic conversion point (ACP) data are processed to calculate the joint cost function, i.e. the input pre-stack dataset must be accessed several hundred times in a random order. Further in the example, for a given simulation step, residual static corrections 308, 310, 312 cannot be computed independently because stations overlap in the CMP and the ACP domains, i.e., the algorithm cannot be massively parallelized on stations.

Next in the exemplary embodiment, the Simultaneous Joint Estimation engine 306 uses a global energy equation:

$E(P\text{-}P, P\text{-}S) = \alpha E(PP) + \beta E(PS)$ with $\alpha$ and $\beta \in [0,1]$ and operating as a weighting term for balancing the energy component terms based on factors such as but not limited to the quality of the seismic data and where E(PP) and E(PS) can be written as:

$$E(PP) = \sum_y \sum_t \left\{ \sum_h d_h^y [t + S_{i(y,h)} + R_{ppj(y,h)}] \right\} \times$$

$$\left\{ \sum_h d_h^{y+1} [t + S_{i(y+1,h)} + R_{ppj(y+1,h)}] \right\}$$

$$E(PS) = \sum_y \sum_t \left\{ \sum_h d_h^y [t + S_{i(y,h)} + R_{psj(y,h)}] \right\} \times$$

$$\left\{ \sum_h d_h^{y+1} [t + S_{i(y+1,h)} + R_{psj(y+1,h)}] \right\}$$

Where Si is the P-P/P-S common source term at surface position I; $R_{ppj}$ is the P-P receiver term at surface position j; and $R_{psj}$ the P-S receiver term at surface position j. For both energy E(PP) and E(PS), y is the sum over CDPs or ACPs; t is the sum over the time samples of the traces; and h is the sum over the offsets within a CDP or ACP gather. The trace data is represented by:

$d^y_h[t+s_{i(y,h)}+R_{j(y,h)}]$, where $S_{i(y,h)}$ and $R_{j(y,h)}$ are the shot and receiver statics for the CDP or ACP; and y and offset h shift the trace data either up or down. It should be noted in the exemplary embodiment that for each selected random station that can be a common P-P source, P-S source, P-P receiver or a P-S receiver, a random static shift is chosen and a new global energy, i.e., $E_{new}$(P-P, P-S), is computed using the global energy equation previously defined. Continuing with the exemplary embodiment, the static shift is retained when the new calculated global energy value is greater than the previous calculated global energy value. It should further be noted in the exemplary embodiment that a metropolis criterion can be used to escape from a potential local minimum and retain the selected static shift. It should be noted in the exemplary embodiment that once all the stations have been visited, the simulation iteration is complete. Further, when the difference between $E_{new}$ and E is within a preconfigured distance from zero, the stop criterion is reached and the Simultaneous Joint Estimation is complete, allowing an output component (not shown) to output common source residual statics for both the P-P data and the P-S data, as well as the receiver residual statics for the P-P data and the P-S data to be estimated. In another aspect of the exemplary embodiment, the weight of the P-P data and the P-S data during the estimation process is controlled by the "α" and "β" parameters as they are varied from zero to one.

Figure 4:
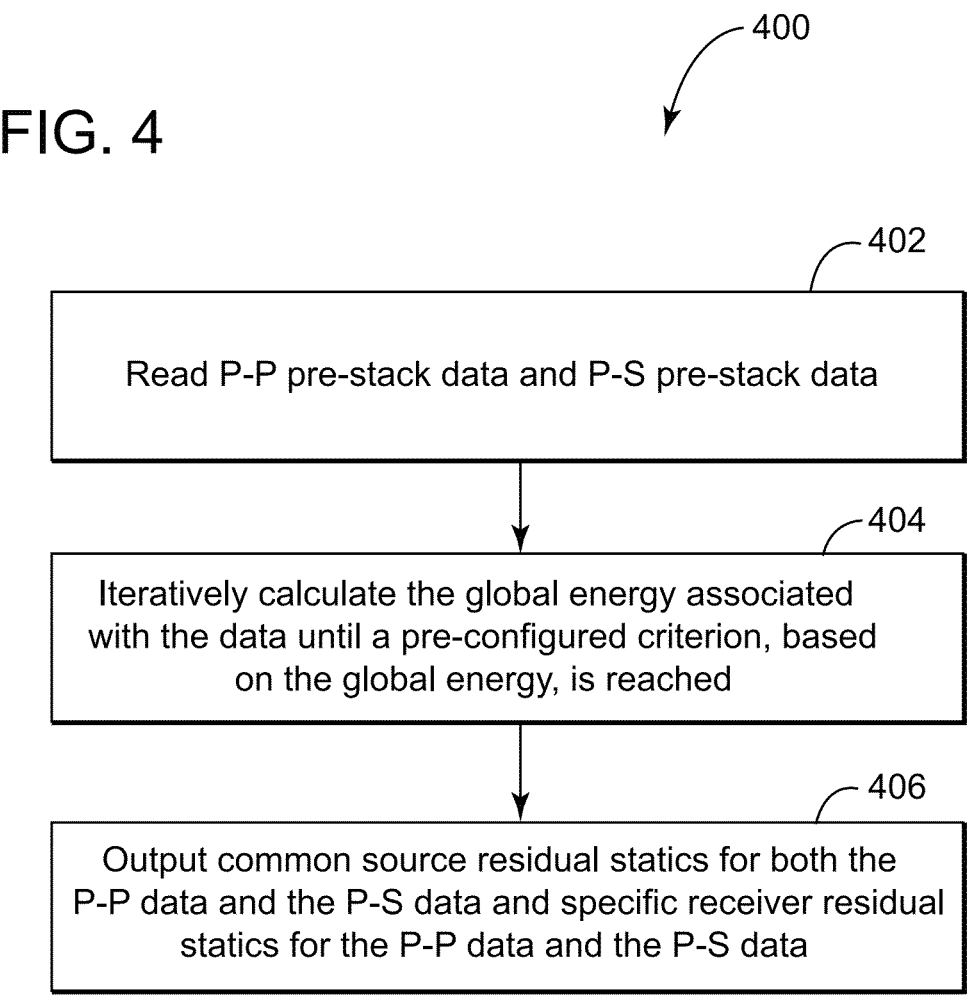
FIG. 4 is a flowchart illustrating a method for simultaneously processing P-P and P-S data and outputting P-P and P-S residual statics.

Looking now to FIG. 4, an exemplary method embodiment of a Simultaneous Joint Estimation (SJE) 400 is depicted. Starting at step 402, the SJE 400 method reads both the P-P pre-stack data and the P-S pre-stack data. Next, at step 404, the SJE 400 method iteratively calculates the global energy associated with the data until a pre-configured criterion, based on the global energy, is reached. Continuing at step 406 of the exemplary method embodiment, the SJE method 400 outputs common source residual statics for both the P-P data and the P-S data and specific receiver residual statics for the P-P data and the P-S data.

Figure 5:
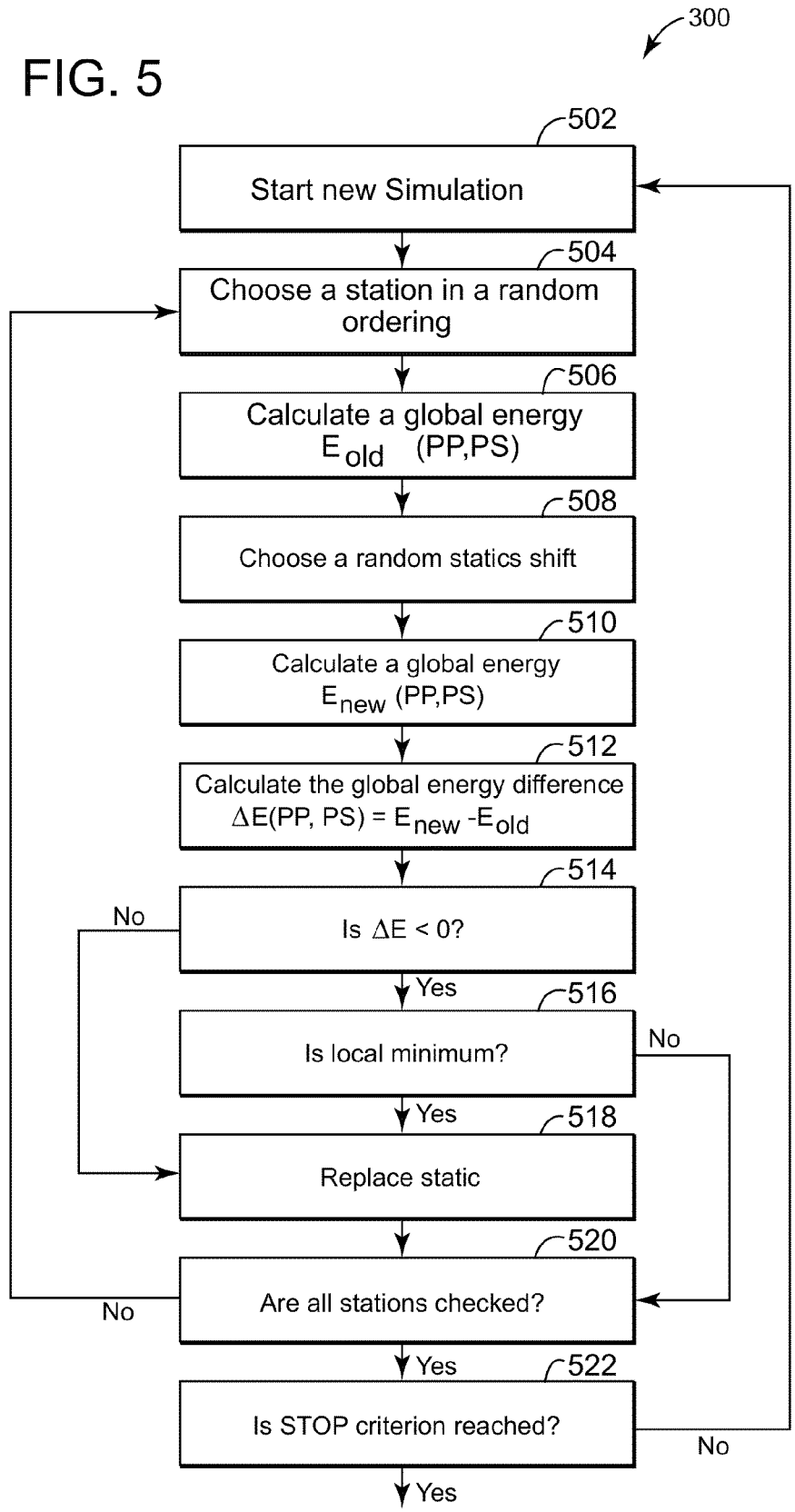
FIG. 5 is a flowchart illustrating a method for simultaneously processing P-P and P-S data using a non-linear simulated annealing.

Looking now to FIG. 5, an exemplary method embodiment further describes the iterative steps 500 of a joint estimation. Starting at step 502 of the exemplary method embodiment, a new simulation begins. Next, at step 504 of the exemplary method embodiment, a station is randomly selected for further processing. It should be noted in the exemplary embodiment that the random station selection order must be different for each simulation. It should further be noted in the exemplary embodiment that for each simulation, all stations, both source and receiver, must be visited. Continuing at step 506 of the exemplary embodiment, a global energy "$E_{old}$(PP, PS)" is calculated, using both P-P data and P-S data, for the randomly selected station. It should be noted in the exemplary embodiment that the global energy is calculated using the previously defined global energy equations. Next, at step 508, for each randomly selected station (e.g. source or receiver), the exemplary method embodiment chooses a random statics shift. Next, at step 510 of the exemplary method embodiment, another global energy "$E_{new}$(PP, PS)" is calculated, based on the random statics shift. It should be noted in the exemplary embodiment that the global energy is calculated using the previously defined global energy equations. Continuing with step 512 of the exemplary embodiment, a difference in global energy ($E_{old}$ and $E_{new}$) is calculated, i.e., $\Delta E(PP, PS) = E_{new} - E_{old}$.

Continuing at step 514 of the exemplary method embodiment, a determination is made for whether $\Delta E$ is greater than zero or less than zero. If $\Delta E$ is greater than zero then the exemplary method embodiment proceeds to step 518 wherein the randomly selected static shift is retained and the method proceeds to step 520. If $\Delta E$ is less than zero then the exemplary method embodiment proceeds to step 516 and a determination is made for whether the calculation is a local minimum. If the calculation is a local minimum then the exemplary method embodiment again proceeds to step 518 wherein the randomly selected static shift is retained and the method proceeds to step 520. If the calculation is not a local minimum then the exemplary method embodiment proceeds to step 520. Next, at step 520 of the exemplary embodiment, a determination is made for whether all the stations have been checked. If all the stations have not been checked then the exemplary embodiment method returns to step 504, randomly selects another station and another iteration of the simulation begins. If all the stations have been checked then the exemplary method embodiment proceeds to step 522 and a determination of whether the stop criterion has been reached. If the stop criterion has not been reached then the exemplary method embodiment returns to step 502 and begins another simulation. If the stop criterion has been reached then the exemplary method embodiment is prepared to output source and receiver statics.

Figure 6:
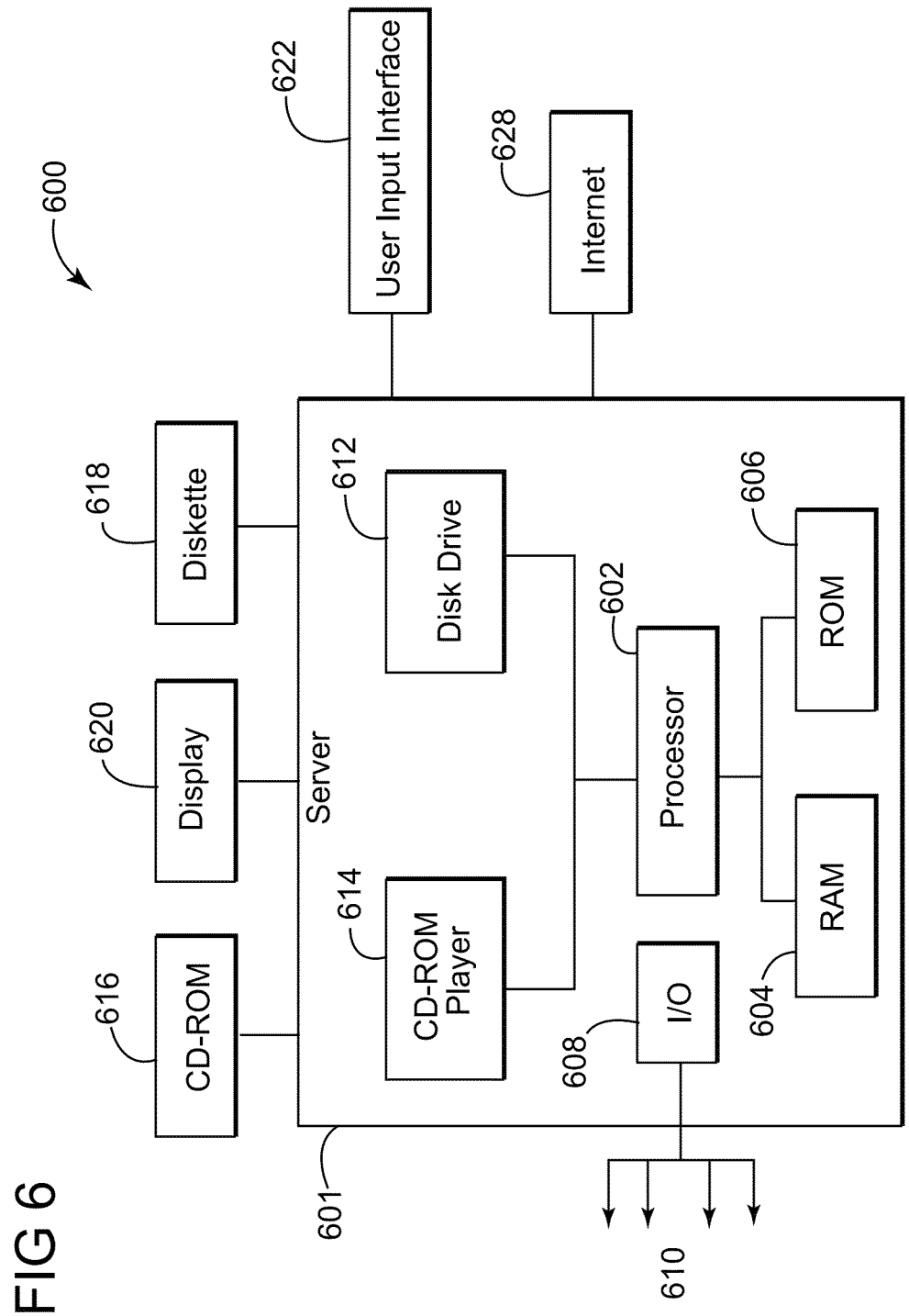
FIG. 6 is a schematic diagram of a computerized system that implements various methods according to an exemplary embodiment.

One or more of the methods discussed above may be implemented in a computerized system as shown in FIG. 6. Such a computerized system 600 may receive, via the input/output interface 602, information pertinent to P-P data and P-S data. In addition, the computerized system 600 may include a processor 604 for processing the above-noted data and for calculating, for example, the global energy of a station. The interface 602 and the processor 604 are connected to a bus 606. Further, the computerized system 600 may include a memory 606 to store the above-noted data, a display 610, a connection 612 to the P-P data and P-S data and other elements common for a computerized system or server as would be recognized by those skilled in the art.

The results of an exemplary embodiment of the aforementioned Simultaneous Joint Estimation (SJE) are compared to a background art cascaded (two-pass) two-pass approach and are presented, along with the raw data, in FIGS. 7(a) through 7(f). In this example, a 3D dataset with one thousand five hundred shotpoints and four thousand receiver stations is analyzed. In the exemplary embodiment, the composite of stack images 700 represents P-P stack raw data 702 in FIG. 7(a), P-S stack raw data 704 in FIG. 7(d), prior art cascaded (two-pass) estimated P-P stack data 706 in FIG. 7(b), prior art cascaded (two-pass) estimated P-S stack data 708 in FIG. 7(e), SJE single-pass estimated P-P stack data 710 in FIG. 7(c) and SJE single-pass estimated P-S stack data 712 in FIG. 7(f). It should be noted in the exemplary embodiment that the shot and receiver distribution is irregular based on field constraints and introduced a high variability of the fold coverage inside each CMP and ACP gather. It should further be noted that the SJE estimation 710, 712 is compared to a conventional cascaded flow for a 2D line extracted from the P-P/P-S volume 706, 708.

Continuing with the exemplary embodiment results, in the background cascaded flow, the P-P residual statics for sources and receivers used a non-linear Monte-Carlo approach for estimating the residual statics in the first pass, the common source term was then applied to the P-S data prior to estimating the P-S receiver term in a second pass. In the SJE flow, all residual terms are estimated in one pass. Looking first to the P-P data, after the statics application derived from the cascaded flow, it can be seen that small values of source and receiver statics have been determined that improve the focusing on the main reflectors in the basin, based on the raw data, as indicated at the arrows 714, 716. Comparing the exemplary embodiment SJE, better results are obtained in less computational time as illustrated at the arrows 718, 720 and characterized as better continuity of the horizontal events on the right part of the section.

Looking now at the P-S data, after the statics application derived from the cascaded flow, the squeezed P-S ACP stack is more focused 708 as compared to the raw P-S data 704 and the continuity of the reflectors has been partially restored as indicated by the arrows 722, 724. Looking to an SJE analysis of the same raw data 704, improvements of the continuity of the horizontal events at the top of the section and on the main reflectors, over the cascaded calculations are evident at the arrows 726, 728.

Summarizing the example, the P-S static issues are better resolved with the SJE. P-S receiver residual statics computation benefits from the contribution of the P-P data during the joint estimation. Further, lateral continuity of events in the P-P data brings strong constraints allowing a more reliable computation of P-S residual statics. Moreover, improvements obtained on the P-P stack after the simultaneous flow show that the contribution of the P-S data is non-negligible on the area where P-P data quality is poorer than P-S data quality, showing that SJE benefits both the P-P and the P-S datasets thus providing better results than a cascaded (two-pass) calculation.

The above-disclosed exemplary embodiments provide a system and a method for simultaneously computing all residual statics terms. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof. It is also noted that although the previously described exemplary embodiments refer to land-based seismic data acquisition, the methods and systems described herein are equally applicable to marine based seismic data acquisition as OBC/OBN.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, stored in a memory and executing on a processor, for estimating residual reflection statics, said method comprising:
simultaneously utilizing a plurality of seismic datasets in a single pass, wherein at least a portion of said plurality of seismic datasets overlap, wherein said plurality of datasets are collected by seismic sensors;
simultaneously estimating residual reflection statics by performing one more weighted simulations of said plurality of seismic datasets until a predetermined stop condition, based on a shared cost function, for said estimating is met; and
generating geophysical structure images corresponding to the simultaneously estimated residual reflection statics to identify hydrocarbons,
wherein the residual reflection statics include common source residual statics for P-P data and P-S data, receiver residual statics for the P-P data, and receiver residual statics for the P-S data.

2. The method of claim 1, wherein each simulation comprises one iteration for each data point of said plurality of seismic datasets.

3. The method of claim 2, wherein said data points are selected in a random order.

4. The method of claim 3, wherein the order of selection of said data points is different for each of said one or more simulations.

5. The method of claim 1, wherein said simulations are linear simulations.

6. The method of claim 1, wherein said simulations are non-linear simulations.

7. The method of claim 6, wherein said non-linear simulations are annealing simulations.

8. The method of claim 7, wherein said plurality of seismic datasets are P-P data and P-S data and said shared cost function is a global energy (E) function calculated for said annealing simulations using both said P-P data and said P-S data simultaneously in the equation $E(P-P, P-S)=\alpha E(P-P)+\beta E(P-S)$ wherein "$\alpha$" and "$\beta$" are weighting factors based on said P-P data and said P-S data wherein $\alpha+\beta=1$.

9. The method of claim 1, wherein said plurality of seismic datasets are the P-P data and the P-S data, and said P-P data and said P-S data is two-dimensional data.

10. The method of claim 1, wherein said plurality of seismic datasets are the P-P data and the P-S data, and said P-P data and said P-S data is three-dimensional data.

11. The method of claim 1, wherein said plurality of seismic datasets are the P-P data and the P-S data, and said P-P data and said P-S data is four-dimensional data and time is one of said four dimensions.

12. The method of claim 1, wherein said stop condition is a differential between a previously calculated global energy value and a new global energy value based on a random statics shift for a randomly selected station associated with at least one of said plurality of seismic datasets.

13. The method of claim 1, wherein said plurality of seismic datasets are P-P data and P-S data, and said residual reflection statics are applied to said P-P data and said P-S data while creating a P-P and a P-S stack data seismic image.

14. A system for estimating residual reflection statics, said system comprising:
an interface configured to receive a first seismic dataset and a second seismic dataset, wherein at least a portion of said first seismic dataset and said second seismic dataset overlap, wherein said first and second seismic datasets are collected by seismic sensors; and
one or more processors configured to execute computer instructions and a memory configured to store said computer instructions, wherein said one or more processors are configured to:
simultaneously process said first seismic dataset and said second seismic dataset;
simultaneously estimate residual reflection statics by performing one or more weighted simulations of said first and second seismic datasets until a predetermined stop condition, based on a shared cost function, for said estimating is met; and
generating geophysical structure images corresponding to the simultaneously estimated residual reflection statics to identify hydrocarbons,
wherein the residual reflection statics include common source residual statics for P-P data and P-S data, receiver residual statics for the P-P data, and receiver residual statics for the P-S data.

15. The system of claim 14, wherein said first seismic dataset and said second seismic dataset is two-dimensional data.

16. The system of claim 14, wherein said first seismic dataset and said second seismic dataset is three-dimensional data.

17. The system of claim 14, wherein said shared cost function is a global energy calculation simultaneously using a P-P pre-stack dataset as said first seismic dataset and a P-S pre-stack dataset as said second seismic dataset.

18. The system of claim 17, further comprising:
applying a linear simulation for estimating said P-P residual statics and said P-S residual statics.

19. The system of claim 17, further comprising:
applying a non-linear simulation for estimating said P-P residual statics and said P-S residual statics.

20. The system of claim 19, wherein said non-linear simulation is a simulated annealing.

21. The system of claim 20, wherein said non-linear simulation further comprises a Monte Carlo method.

22. A method, stored in a memory and executing on a processor, for estimating residual reflection statics, said method comprising:
simultaneously utilizing P-P and P-S datasets in a single pass, wherein said P-P and P-S datasets are collected by seismic sensors, wherein at least a portion of the P-P and P-S datasets overlap;
simultaneously estimating residual reflection statics by performing one or more weighted simulations on said P-P and P-S datasets until a predetermined stop condition, based on a shared cost function, for said estimating is met; and
generating geophysical structure images corresponding to the simultaneously estimated residual reflection statics to identify hydrocarbons,
wherein said shared cost function is a global energy (E) function calculated for said simulations using both said P-P data and said P-S data simultaneously in the equation $E(P-P, P-S)=\alpha E(P-P)+\beta E(P-S)$, wherein "$\alpha$" and "$\beta$" are weighting factors based on said P-P data and said P-S data wherein $\alpha+\beta=1$.

* * * * *